(12) United States Patent
Ohta et al.

(10) Patent No.: US 8,704,632 B2
(45) Date of Patent: Apr. 22, 2014

(54) IN-VEHICLE SYSTEM, IN-VEHICLE DEVICE, AND EXECUTION CONTROL METHOD OF COMMAND OF THE IN-VEHICLE DEVICE

(75) Inventors: Satoshi Ohta, Kobe (JP); Noriaki Inoue, Kobe (JP); Toshio Kitahara, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 406 days.

(21) Appl. No.: 12/591,445

(22) Filed: Nov. 19, 2009

(65) Prior Publication Data

US 2010/0134242 A1    Jun. 3, 2010

(30) Foreign Application Priority Data

Nov. 28, 2008    (JP) .................................. 2008-305255

(51) Int. Cl.
*G05B 19/00* (2006.01)
(52) U.S. Cl.
USPC .................... 340/5.27; 455/569.1; 455/569.2; 455/575.9
(58) Field of Classification Search
USPC ........ 455/420, 566, 569.2, 556.2, 567, 569.1, 455/575.9; 340/1.1, 5.1, 5.2, 5.21, 5.27
See application file for complete search history.

(56) References Cited

U.S. PATENT DOCUMENTS

| | | | |
|---|---|---|---|
| 2002/0019249 A1* | 2/2002 | Kashu et al. ................. | 455/566 |
| 2003/0156097 A1* | 8/2003 | Kakihara et al. ............. | 345/156 |
| 2010/0075655 A1* | 3/2010 | Howarter et al. ............. | 455/420 |

FOREIGN PATENT DOCUMENTS

| | | |
|---|---|---|
| JP | A-2001-144850 | 5/2001 |
| JP | A-2002-052986 | 2/2002 |
| JP | A-2003-244343 | 8/2003 |
| JP | A-2004-045117 | 2/2004 |
| JP | A-2006-185235 | 7/2006 |
| JP | A-2006-203737 | 8/2006 |
| JP | A-2006-279751 | 10/2006 |
| JP | A-2006-295660 | 10/2006 |
| JP | A-2006-310924 | 11/2006 |
| JP | A-2007-033220 | 2/2007 |
| JP | A-2008-048051 | 2/2008 |
| JP | A-2008-224616 | 9/2008 |

OTHER PUBLICATIONS

Mar. 12, 2013 Office Action issued in Japanese Patent Application No. 2008-305255; with English-language translation.

* cited by examiner

*Primary Examiner* — Brian Zimmerman
*Assistant Examiner* — An T Nguyen
(74) *Attorney, Agent, or Firm* — Oliff PLC

(57) ABSTRACT

In an in-vehicle system, a portable terminal interprets a command intended by operation data operated by an occupant via a touch panel of a DA, and determines whether the interpreted command is a prohibition command, that is, whether execution of the command in an own device is prohibited. When the command is not a prohibition command, the portable terminal is caused to execute the command, and when it is a prohibition command, the DA is caused to execute the command.

2 Claims, 8 Drawing Sheets

FIG.7

| PROHIBITION COMMAND | PRIVATE FLAG |
|---|---|
| COMMAND $\alpha$ | OFF |
| COMMAND $\beta$ | OFF |
| COMMAND $\gamma$ | ON |
| COMMAND $\delta$ | OFF |
| ⋮ | ⋮ |

51a

| COMMAND | EXECUTING DEVICE |
|---|---|
| COMMAND a | PORTABLE TERMINAL |
| COMMAND b | BOTH |
| COMMAND c | DA |
| COMMAND d | DA |
| COMMAND e | NONE |
| ⋮ | ⋮ |

IN-VEHICLE SYSTEM, IN-VEHICLE DEVICE, AND EXECUTION CONTROL METHOD OF COMMAND OF THE IN-VEHICLE DEVICE

CROSS-REFERENCE TO RELATED APPLICATIONS

This application is based upon and claims the benefit of priority of the prior Japanese Patent Application No. 2008-305255, filed on Nov. 28, 2008, the entire contents of which are incorporated herein by reference.

BACKGROUND OF THE INVENTION

1. Field of the Invention

The present invention relates to an in-vehicle system including a portable terminal and an in-vehicle device, an in-vehicle device, and a method for controlling an execution of commands of the in-vehicle device.

2. Description of the Related Art

In recent years, in-vehicle devices are mounted on many vehicles. In-vehicle device has, for example, a navigation function for guiding the vehicle along a route using images or sound, a radio receiving function, and an audio function.

While such an in-vehicle device can provide various functions in a vehicle, it is also required to have a high performance to achieve these functions. Therefore, the initial cost of the in-vehicle device tends to become high, and cost reduction thereof has become increasingly demanded.

To meet these demands, in-vehicle systems are being developed. The in-vehicle systems link an in-vehicle device incorporated in a vehicle with a portable terminal such as a portable telephone and a personal handy-phone system (PHS).

This type of in-vehicle system uses functions preinstalled in the portable terminal represented by a third-generation portable phone, such as a navigation function, an audio function, and a moving-image reproduction function, and causes a speaker and a display of the in-vehicle device to generate sound and images.

In brief, the in-vehicle device of such in-vehicle system is specialized in outputting sound and images. Hence, both the hardware configuration and the software configuration of the in-vehicle device are simplified. Consequently, the in-vehicle device as a product can be provided at a lower price.

For example, Japanese Patent Application Laid-open No. 2003-244343 discloses an information display system which configures a portable terminal and an in-vehicle device in a mutually-communicable manner so as to supply data displayed on a screen of the portable terminal to the in-vehicle device, and cause the data to be displayed on a screen of the in-vehicle device.

However, as described below, the conventional technique of Japanese Patent Application Laid-open No. 2003-244343 has a problem of being unable to appropriately execute a command given by an occupant.

For example, in the information display system mentioned above, when a function corresponding to a command given by an occupant is executable in both the in-vehicle device and the portable terminal, the command is not always executed in a device that the occupant intends to operate, and thus the command is not executed as intended by the occupant.

This problem is explained in detail. When the in-vehicle device includes a display-input unit (such as a touch panel) which can display an image and receive an input, as a user interface, a screen displayed on the touch panel is defined and generated by an application of the portable terminal and the like. The in-vehicle device cannot interpret the intention of a command given by the occupant. Therefore, the in-vehicle device transfers operation data received on the touch panel to the portable terminal. Meanwhile, the portable terminal interprets and executes the command based on the operation data supplied from the in-vehicle device.

Therefore, even when an occupant operates to execute the command in the in-vehicle device, the command is actually executed by the portable terminal, and thus a command cannot be executed as intended by the occupant.

Further, the information display system causes data displayed on the screen of the portable terminal to be displayed on the in-vehicle device. When all the data in the portable terminal is displayed on the in-vehicle device without distinction, occupants other than the owner of the portable terminal may see the personal information of the owner of the portable terminal. As a result, some command may be executed against the will of the owner.

More specifically, private information of an individual, such as an address list, an outgoing/incoming call register, e-mails, and record of the e-mails, are registered in the portable terminal. Any occupant of a vehicle can view the information when he/she performs a browsing operation.

Particularly, when display data of a portable terminal belonging to a driver is displayed on an in-vehicle device, the driver cannot perform operations other than driving the vehicle. Therefore, the driver cannot cancel or stop another occupant's operation of browsing personal information.

SUMMARY OF THE INVENTION

It is an object of the present invention to at least partially solve the problems in the conventional technology.

According to one aspect of the invention, an in-vehicle system includes a portable terminal and an in-vehicle device, and at least one of the portable terminal and the in-vehicle device includes: an acquiring unit that acquires a command corresponding to an operation performed with respect to the portable terminal or the in-vehicle device; a determining unit that determines whether execution of a command acquired by the acquiring unit is permitted; and an execution controller that controls to either cause at least one of the portable terminal and the in-vehicle device to execute the command or to cause none of the portable terminal and the in-vehicle device to execute the command, based on a determination result of the determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an example of a prohibition command list according to the second embodiment;

DETAILED DESCRIPTION OF THE PREFERRED EMBODIMENTS

Exemplary embodiments of an in-vehicle system, an in-vehicle device, and a method for controlling execution of commands of the in-vehicle device according to the present invention will be explained below in detail with reference to the accompanying drawings. A case that the present invention is applied to an in-vehicle device incorporated in a vehicle is explained below.

An outline of an in-vehicle device according to embodiments of the present invention is explained first. Among systems incorporated in a vehicle, the in-vehicle system of the embodiments is specialized in linking a portable terminal to the in-vehicle device by connecting the portable terminal to the in-vehicle device incorporated in the vehicle by wireless communications, and causing a speaker and a display of the in-vehicle device to generate sound and images by using various application functions loaded in the portable terminal, thereby outputting sound and images from the in-vehicle device incorporated in the vehicle.

To be specific, the in-vehicle device according to the embodiments is a display-equipped in-vehicle wireless communication device (Display Audio: DA). From the viewpoint of distinguishing the in-vehicle device of the embodiments from conventional in-vehicle devices, the in-vehicle device of the embodiments is called "DA" in the following descriptions. Unless it is necessary to specifically distinguish the device from the conventional one, it is simply called "in-vehicle device".

Figure 1:
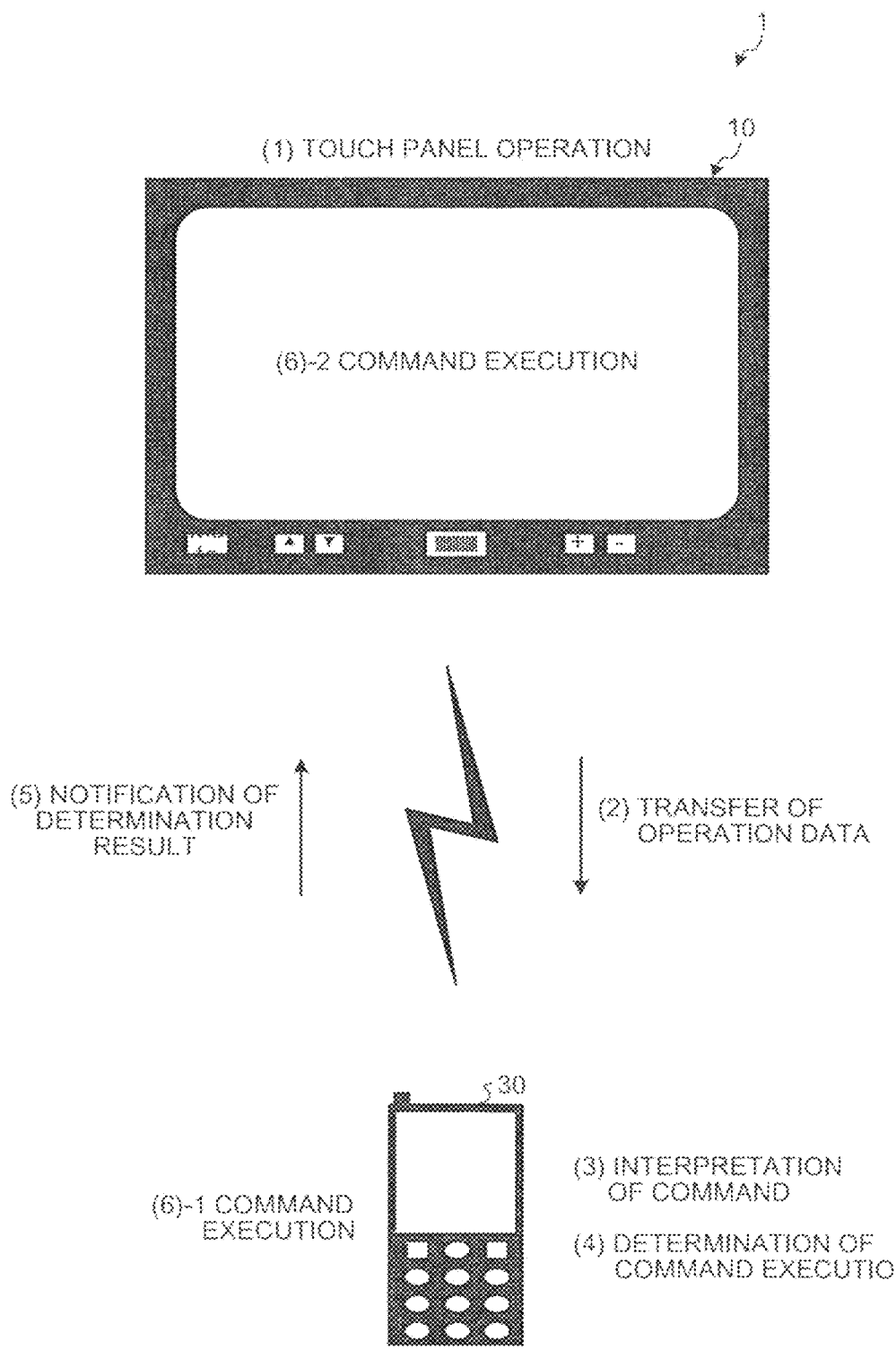
FIG. 1 is a conceptual diagram for explaining an outline of an in-vehicle system according to a first embodiment of the present invention.

FIG. 1 is a conceptual diagram for explaining an outline of an in-vehicle system according to a first embodiment of the present invention. An in-vehicle system 1 includes a display-equipped in-vehicle wireless communication device (DA) 10 incorporated in a vehicle, and a portable terminal 30 that belongs to an occupant of the vehicle.

In the in-vehicle system 1, a linkage application to link the DA 10 and the portable terminal 30 is installed in the portable terminal 30, so that the DA 10 can call various applications incorporated in the portable terminal 30. In the in-vehicle system 1, the linkage application can make the DA 10 function as if a touch panel of the DA 10 is a screen of the portable terminal 30.

The DA 10 receives various instructions input by an occupant of the vehicle via the touch panel of the DA 10. However, the DA 10 cannot interpret a command based on operation contents, because the portable terminal 30 is configured to define and generate a screen to be displayed on the touch panel. Therefore, as described above, irrespective of whether the operation data received by the touch panel is a command to the DA 10 or to the portable terminal 30, the command is transferred to the portable terminal 30.

The in-vehicle system according to the first embodiment is characterized in that: when a command given by an occupant via the touch panel is executable in both the DA 10 and in the portable terminal 30, the system causes the command to be executed in a device intended by the occupant.

That is, the portable terminal 30 according to the first embodiment determines whether a command given by the occupant is a prohibition command whose execution in the portable terminal 30 is prohibited. When the command is not a prohibition command, the portable terminal 30 executes the command. When the command is a prohibition command, the DA 10 executes the command.

More specifically, when the DA 10 receives on the touch panel an operation to the in-vehicle system 1 (1), the DA 10 transfers to the portable terminal 30 operation data including operation contents (a pressed coordinate position on the screen, for example) received on the touch panel (2).

Meanwhile, the portable terminal 30 interprets a command meant by the operation data sent from the DA 10 (3), determines whether the interpreted command is a prohibition command, that is, whether the command is one whose execution in the own device is prohibited (4), and notifies a result of the determination to the DA 10 (5).

In this case, when the command interpreted from the operation data is not the command whose execution in the own device is prohibited, the portable terminal 30 notifies to the DA 10 a determination result that execution of the command in the DA 10 is not permitted (5), and also performs a process corresponding to the command (6)-1. When the command is a prohibition command, the portable terminal 30 notifies to the DA 10 a determination result that execution of the command in the DA 10 is permitted (5), and causes the DA 10 to perform a process corresponding to the command (6)-2.

As described above, in the first embodiment, when execution of a command in the portable terminal 30 is permitted, execution of the command in the DA 10 is regarded to be prohibited. A process corresponding to the command is performed based on alternative judgment. With this arrangement, an input command, for which the determination is to be made, is compared only with the prohibition commands. At the same time, it is made unnecessary to determine which one of the devices constituting the in-vehicle system 1 is to execute the command. With this configuration, a command can be executed in a device intended by an occupant.

Assume that the occupant performs an operation of increasing a sound volume on the touch panel of the DA 10, to increase the sound volume of music being played. When the portable terminal 30 is set beforehand so as to recognize that a command of "sound volume adjustment" is a prohibition command, the portable terminal 30 determines that execution of the command in the portable terminal 30 is not permitted, and the command of increasing the sound volume is executed in the DA 10. As a result, it is possible to prevent the portable terminal 30 from adjusting the sound volume of the portable terminal 30 itself against the intention of the occupant.

Consequently, in the first embodiment, a command is executed in a device intended by an occupant, and the occupant can execute the command appropriately.

A configuration of devices constituting the in-vehicle system 1 according to the first embodiment is explained next. A configuration of the DA 10 is explained first, and a configuration of the portable terminal 30 is explained next.

Figure 2:
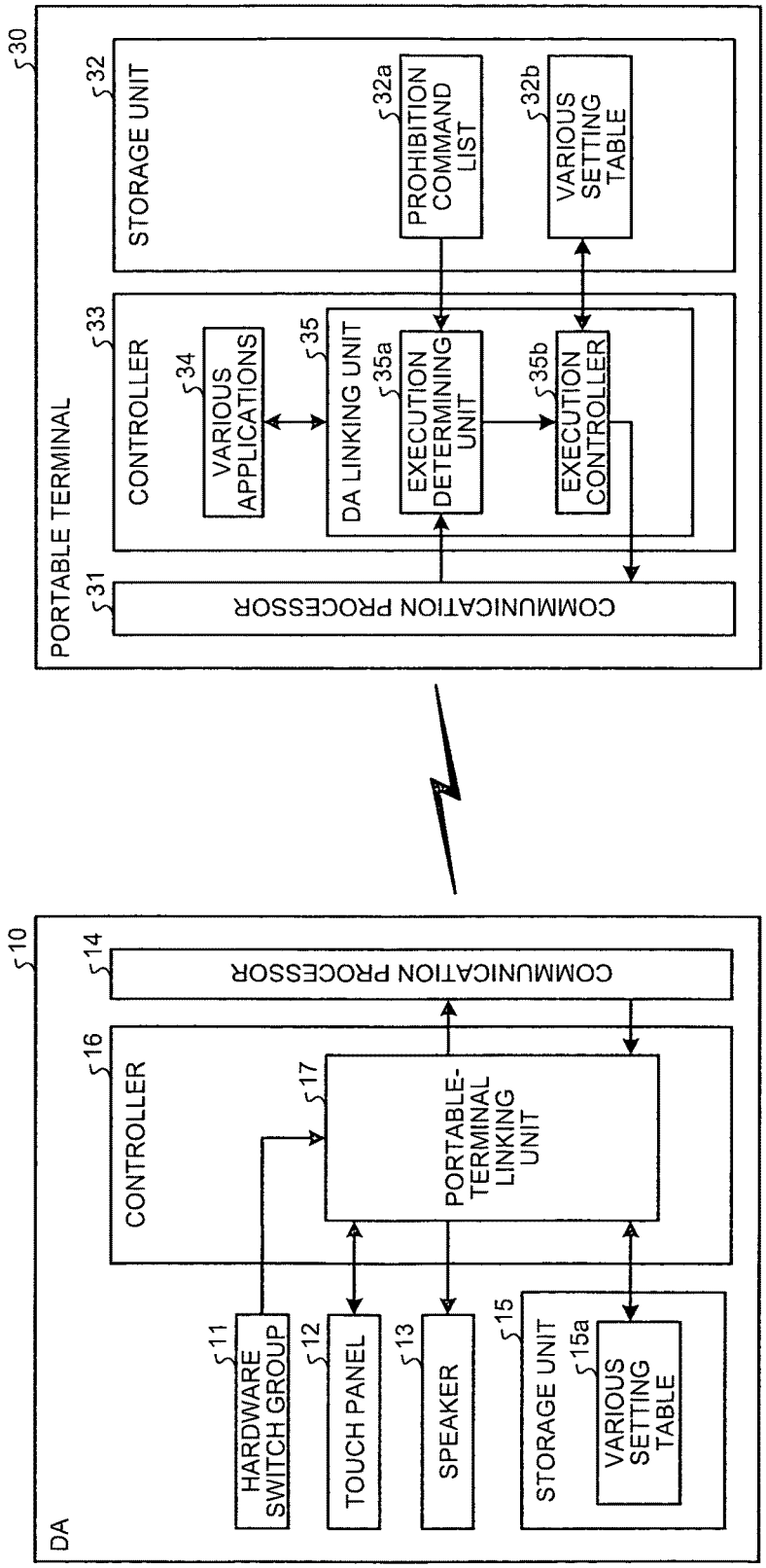
FIG. 2 is a functional block diagram of a configuration of devices constituting the in-vehicle system according to the first embodiment.

FIG. 2 is a functional block diagram of a configuration of devices constituting the in-vehicle system 1 according to the first embodiment. The actual DA 10 may include functional units in addition to functional units depicted in FIG. 2 (e.g., a sound input unit and a sound recognizing unit such as a microphone). However, FIG. 2 depicts only constituent elements necessary to explain characteristics of the DA 10 according to the first embodiment.

As illustrated in FIG. 2, the DA 10 includes a hardware switch group 11, a touch panel 12, a speaker 13, a communication processor 14, a storage unit 15, and a controller 16.

The hardware switch group 11 includes various kinds of mechanical switches provided on an external surface of the DA 10. For example, they are mechanical switches such as a push switch, a slide switch, and a rotary switch.

The touch panel 12 is a device capable of displaying data and receiving an input, and is capable of receiving an operation input on a display unit such as a liquid-crystal panel and a monitor. The touch panel 12 displays, on a screen, a screen image specific to the DA 10 or display data generated by various applications of the portable terminal 30 (such as a navigation image and a moving picture), and detects a pressing operation on a drawing part such as a button icon displayed on the screen.

The operation received on the touch panel 12 includes an operation of a command common to both the DA 10 and the portable terminal 30 such as the operation concerning adjustment of sound quality and adjustment of contrasting density and brightness of the screen.

The speaker 13 is an audio device that outputs sound corresponding to a sound signal output from the controller 16. There can be more than one speaker 13 in a vehicle.

The communication processor 14 performs wireless communications with other devices. Bluetooth®, for example, is a preferable example performing data exchanges through weak radio waves. The communication processor 14 can also communicate via other mediums such as infrared rays and ultrasonic waves, or can exchange data by wired connection with a specific device.

The storage unit 15 is a storage device such as a nonvolatile memory that stores data and programs necessary for various processes performed by the controller 16. The storage unit 15 also stores a various setting table 15a that manages various kinds of setting such as setting concerning adjustment of volume, adjustment of an amplification factor of low pitch sound and high pitch sound, and adjustment of an equalizer, and setting concerning a screen such as contrasting density and brightness thereof.

The controller 16 controls the entire DA 10, and includes a portable-terminal linking unit 17. In practice, programs corresponding to these functional units are stored in advance in a read only memory (ROM) or a nonvolatile memory (not shown). The controller 16 executes these programs by loading the programs onto a central processing unit (CPU), and causes the portable-terminal linking unit 17 to perform a corresponding process.

The portable-terminal linking unit 17 is a functional unit that performs various kinds of processing linked with the portable terminal 30. Specifically, the portable-terminal linking unit 17 has basic functions of the DA 10 to output display data and audio data generated by various applications 34 of the portable terminal 30 to the touch panel 12 and the speaker 13. Further, the portable-terminal linking unit 17 transfers to the portable terminal 30 operation data (a pressed coordinate position on a screen, for example) including operation contents received on the touch panel 12. The portable-terminal linking unit 17 further performs a process corresponding to a command in response to a result of determination on execution of the command notified by the portable terminal 30. In this way, the portable-terminal linking unit 17 performs a process specific to the first embodiment on receiving an operation command.

For example, upon receiving an operation command of adjusting sound quality or adjusting a screen, the portable-terminal linking unit 17 transfers the operation data to the portable terminal 30. Upon receiving a notification of permitting execution of a command from the portable terminal 30 in response, the portable-terminal linking unit 17 updates setting of an item, which corresponds to the execution command, in the various setting table 15a stored in the storage unit 15 according to the setting of the sound quality and the screen received from the occupant. Upon receiving a notification of not permitting the execution of the command from the portable terminal 30 in response, the command is not executed at the DA 10 side.

A configuration of the portable terminal 30 according to the first embodiment is explained next. As illustrated in FIG. 2, the portable terminal 30 includes a communication processor 31, a storage unit 32, and a controller 33.

The portable terminal 30 in practice may include other functional units in addition to functional units depicted in FIG. 2 (for example, an operating unit, a display unit, a sound input unit and a sound recognizing unit such as a speaker and a microphone). However, FIG. 2 only depicts constituent elements necessary to explain characteristics of the portable terminal 30 according to the first embodiment.

The communication processor 31 performs wireless communications with other devices. Actually, two communicating units are provided separately: a communicating unit that performs communications by radio waves with a base station of a carrier present as a relay device; and a short-distance communicating unit that directly communicates with other portable terminal 30 and the DA 10 by weak radio waves. The communication processor 31 exchanges data with the DA 10 via the short-distance communicating unit.

The storage unit 32 is a storage device such as a nonvolatile memory that stores data and programs for various processes performed by the controller 33. The storage unit 32 stores, for example, a prohibition command list 32a, and a various setting table 32b that manages various kinds of setting including setting concerning sound quality and a screen.

Figure 3:
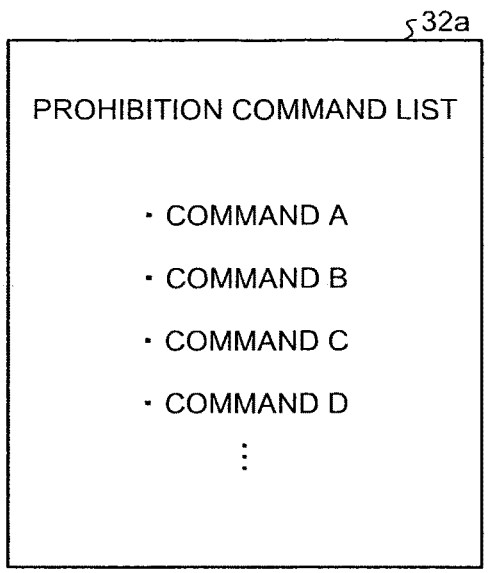
FIG. 3 is an example of a prohibition command list according to the first embodiment.

The prohibition command list 32a is a list of prohibition commands. For example, as illustrated in FIG. 3, a list of commands whose execution by the portable terminal 30 is prohibited is included in the storage unit 32.

With regard to a prohibition command registered in the prohibition command list 32a, it is preferable to register as a reference a command which is executable in both the DA 10 and the portable terminal 30, like a command concerning adjustment of sound quality and a screen, and which causes a setting change with which an owner of the portable terminal 30 is expected to feel uncomfortable when using the portable terminal 30 by itself after getting off the vehicle.

Though the portable terminal 30 functions in coordination with the DA 10 while the portable terminal 30 is in the vehicle, the portable terminal 30 is placed in a different environment when it is used outside the vehicle and functions as a single unit. Therefore, if the setting concerning sound quality and the screen of the portable terminal 30 is changed in the vehicle to satisfy personal preference for sound or image of the DA 10, the owner of the portable terminal may feel uncomfortable with the setting when the owner uses the portable terminal by itself after getting off the vehicle. To prevent such inconvenience in advance, commands as described above are held beforehand in the list as the prohibition commands.

The prohibition command list 32a may be downloaded from a server of a manufacturer of the in-vehicle device, a manufacturer of the vehicle, or a carrier. Alternatively, the prohibition command list 32a may be acquired from the DA 10 when establishing communications with the DA 10. Still alternatively, the prohibition command list 32a may be stored in advance during manufacture of the portable terminal 30. The prohibition command can be arbitrarily added to or deleted from the prohibition command list 32a.

The controller 33 controls the portable terminal 30 as a whole, and includes the various applications 34, and a DA linking unit 35. In practice, programs corresponding to these functional units may be stored in advance in a ROM or a nonvolatile memory (not shown). The controller 33 executes these programs by loading the programs onto the CPU, and causes the various applications 34 and the DA linking unit 35 to perform a corresponding process.

The various applications 34 include applications such as navigation software, mail software, tuner software, and a media player. Specifically, after the connection is established and the portable terminal 30 is linked with the DA 10, the various applications 34 are loaded from the storage unit 32 and started up in response to a request from the DA linking unit 35 described later, and perform a process corresponding to the command received via the touch panel of the DA 10.

The DA linking unit 35 is a functional unit that performs various processes in cooperation with the portable terminal 30. Specifically, the DA linking unit 35 has basic functions concerning a linkage with the DA 10, such as interpreting a command based on the operation data sent from the DA 10, and starting each application by loading the application from the storage unit 32. The DA linking unit 35 further includes an execution determining unit 35a and an execution controller 35b as functional units specific to the first embodiment.

The execution determining unit 35a is a processor that determines whether to permit execution of a command interpreted by the DA linking unit 35. Specifically, the execution determining unit 35a determines whether a command given by an occupant via the touch panel 12 of the DA 10 is registered in the prohibition command list 32a stored in the storage unit 32.

The execution controller 35b is a processor that controls which one of the DA 10 and the portable terminal 30 is to execute a command based on a result of determination by the execution determining unit 35a. Specifically, when a command concerned is not a prohibition command, the execution controller 35b responds with a determination result indicating that execution of the command in the DA 10 is not permitted, and performs a process corresponding to the command. On the other hand, when a command concerned is a prohibition command, the execution controller 35b responds with a determination result indicating that execution of the command in the DA 10 is permitted, and causes the DA 10 to perform a process corresponding to the command.

When a command obtained by interpreting the operation data sent from the DA 10 is an adjustment command concerning sound quality and a screen, and the command is not a prohibition command, the execution controller 35b updates the setting of an item, which corresponds to the execution command, in the various setting table 32b stored in the storage unit 32 to setting of sound quality and a screen received from the occupant. When a command concerned is a prohibition command, the command is not executed at the portable terminal 30 side.

A flow of a command-execution control process according to the first embodiment is explained next. The command-execution control process is performed when the portable terminal 30 is present within a communication range of the DA 10 and a connection is established between the DA 10 and the portable terminal 30.

Figure 4:
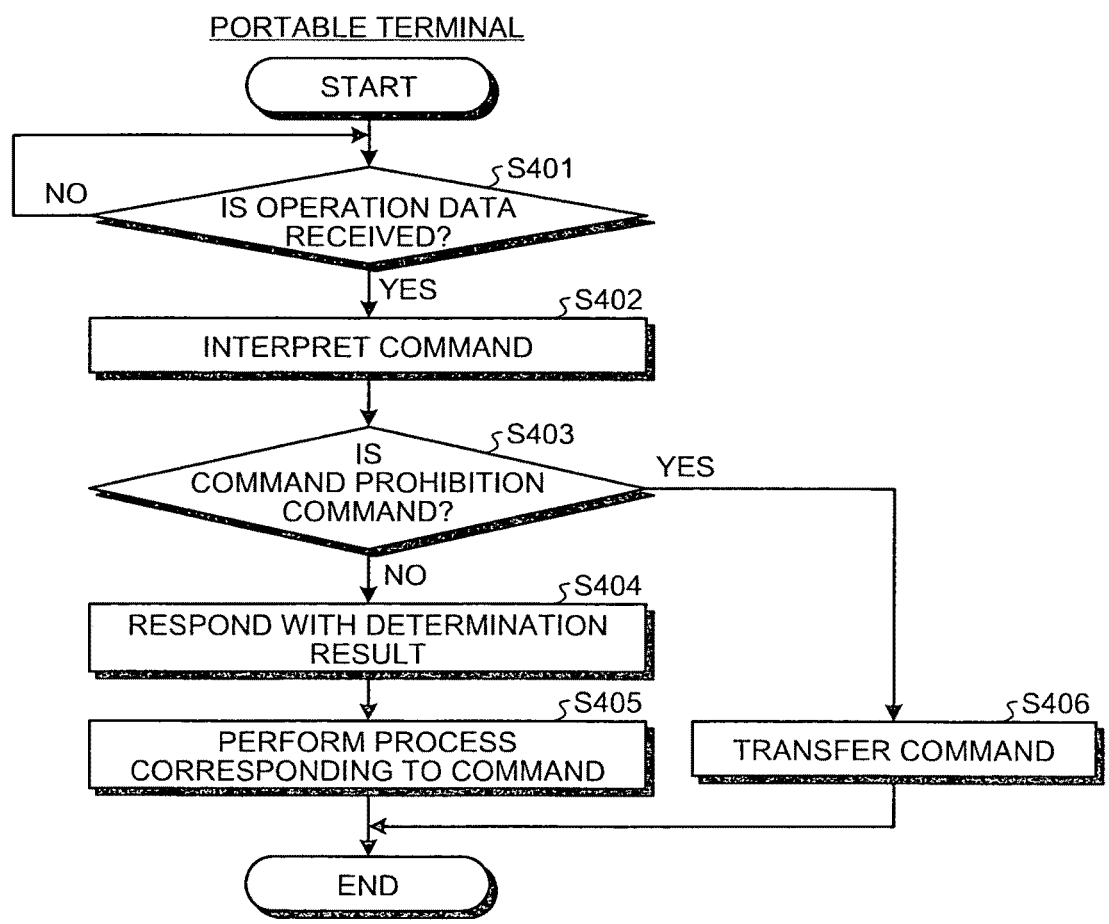
FIG. 4 is a flowchart of a command-execution control-process procedure according to the first embodiment.

FIG. 4 is a flowchart of a command-execution control-process procedure according to the first embodiment. As illustrated in FIG. 4, when the portable terminal 30 is in a state of waiting for reception of operation data, and receives the operation data from the DA 10 (YES at Step S401), the DA linking unit 35 interprets the command corresponding to the operation of the occupant based on the operation data such as a coordinate position of an icon pressed on the touch panel (Step S402).

The execution determining unit 35a determines whether the interpreted command is registered in the prohibition command list 32a stored in the storage unit 32 (Step S403).

When the execution determining unit 35a determines that the command is not a prohibition command (NO at Step S403), the execution controller 35b responds with a result of determination indicating that execution of the command in the DA 10 is not permitted, and performs the process corresponding to the command (Steps S404 and S405), and ends the process.

On the other hand, when the execution determining unit 35a determines that the command is a prohibition command (YES at Step S403), the execution controller 35b responds to the DA 10 with the interpreted command and a result of determination indicating that execution of the command in the DA 10 is permitted, causes the DA 10 to perform the process corresponding to the command (Step S406), and ends the process.

As described above, according to the first embodiment, the portable terminal 30 is configured to acquire a command corresponding to the operation performed on the touch panel 12 of the DA 10. The portable terminal 30 determines whether to execute the command or not depending on whether the acquired command matches a prohibition condition for the portable terminal 30. When it is determined that the execution of the command is permitted, the portable terminal 30 executes the command, and when it is determined that the execution of the command is not permitted, the DA 10 is caused to execute the command.

With this arrangement, an input command for which determination is to be made is compared only with the prohibition command. At the same time, it is made unnecessary to determine whether each of the devices constituting the in-vehicle system 1 is allowed, to execute the command. With this arrangement, a command can be executed in a device intended by an occupant.

Therefore, in the first embodiment, a configuration to determine execution of a command can be simplified, and a command given by an occupant can be executed appropriately.

Further, in the first embodiment, display data of the portable terminal 30 is displayed on the touch panel of the DA 10 as the in-vehicle device, and the command is received via the touch panel 12. Therefore, an operation can be received on a screen of the touch panel 12 having a larger size than the screen of the portable terminal 30, whereby operability is improved. Consequently, even when an operation is received in a mobile object such as a vehicle, the operation can be performed easily and safely.

In the first embodiment, when a command received through an operation by an occupant is not a prohibition command, the command is executed by the portable terminal 30. When the command is a prohibition command in the portable terminal 30, the command is executed in the DA 10. The same advantageous effect can be obtained by configuring the portable terminal 30 in such a manner that the DA 10 executes a command when the command is not a prohibition command of the DA 10, which is a device other than the portable terminal 30, and that the portable terminal 30 executes a command when the command is the prohibition command of the DA 10.

In the first embodiment, the portable terminal 30 determines whether the command can be executed or not, and controls the execution of the command. However, the portable terminal 30 does not need to be a command-executing device, and the other device can be a command-executing device. In a second embodiment of the present invention, a DA 50 determines whether the command can be executed or not, and controls the execution of the command.

Figure 5:
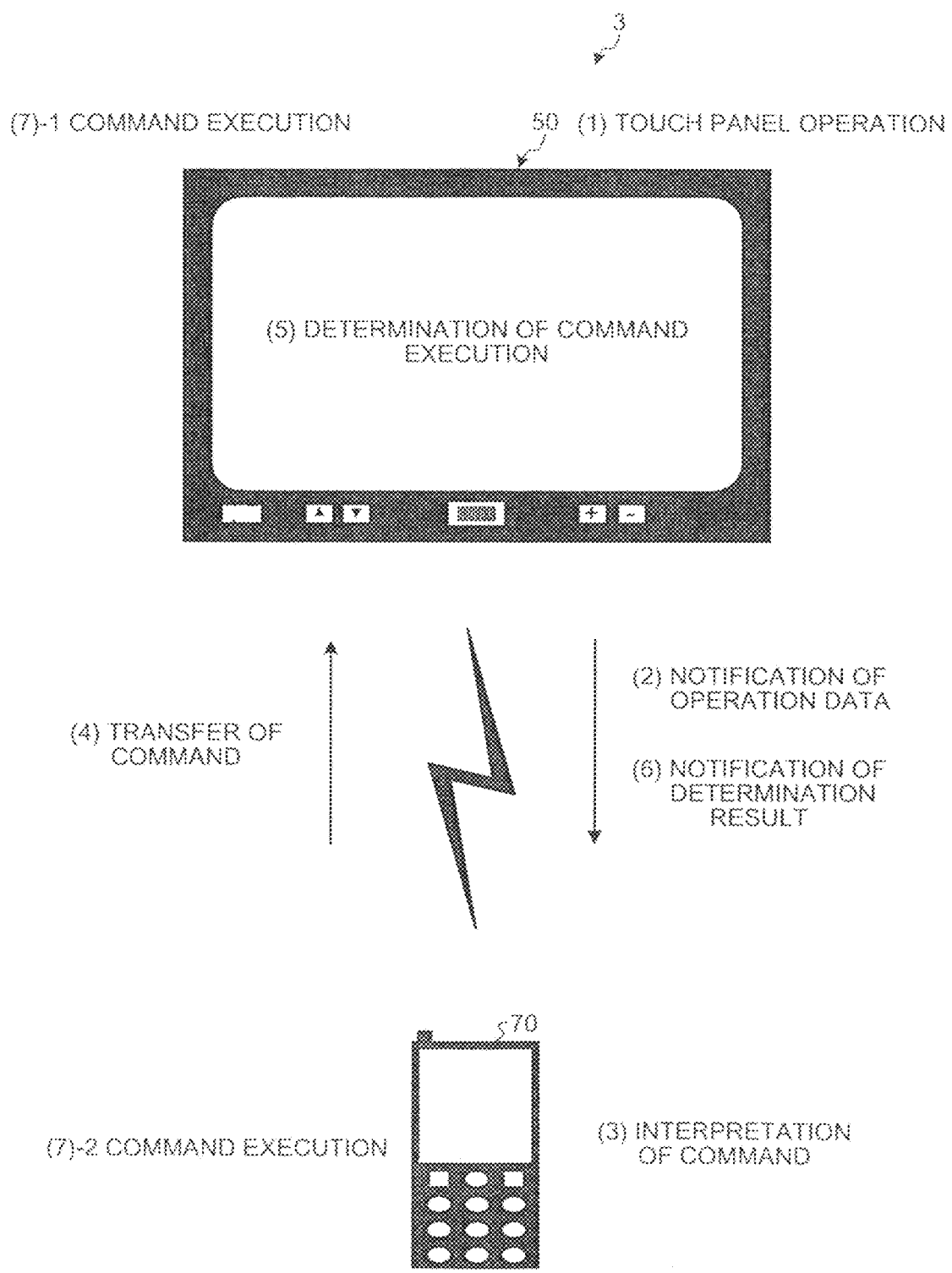
FIG. 5 is a conceptual diagram for explaining an outline of an in-vehicle system according to a second embodiment of the present invention.

FIG. 5 is a conceptual diagram for explaining an outline of an in-vehicle system according to the second embodiment. As illustrated in FIG. 5, in a similar manner to that of the in-vehicle system 1 according to the first embodiment depicted in FIG. 1, an in-vehicle system 3 receives an operation on a touch panel of the DA 50 (1), transfers to a portable terminal 70 operation data including operation contents (a pressed coordinate position on the screen, for example) received on the touch panel (2), and causes the portable terminal 70 to interpret a command meant by the operation data sent from the DA 50 (3). The processes from (1) to (3) are common to those in the first embodiment.

On the other hand, the in-vehicle system 3 according to the second embodiment causes the command interpreted by the portable terminal 70 to be transferred again to the DA 50 (4), and causes the DA 50 to determine whether the command can be executed or not (5). The in-vehicle system 3 of the second embodiment is different from the in-vehicle system 1 of the first embodiment in that the in-vehicle system 3 performs the processes (4) and (5), and an additional scheme is added for the determination.

The DA 50 determines whether a command acquired from the portable terminal 70 is a command whose execution in the own device is prohibited in a similar manner to that in the first embodiment, and further determines whether the execution of the command in the other device, i.e., the portable terminal 70, is prohibited or not.

As explained above, the DA 50 determines whether a command is a prohibition command of the own device, as well as whether a command is a prohibition command of the other device. This is because not all the commands are a command present in both the DA 50 and the portable terminal 70, and a command given by an occupant is not always the one which can be executed in an alternative manner.

For example, a command not present in both of the DA 50 and the portable terminal 70, such as a command specific for the portable terminal 70, is determined to be executed in the portable terminal 70 and the DA 50 is prohibited from executing the same. Therefore, the command prohibited in the DA 50 is executed unconditionally in the portable terminal 70.

However, when the prohibition command in the DA 50 is executed in the portable terminal 70, private information of an individual, such as an address list, an incoming/outgoing call register, e-mails, and record of the e-mails, are also browsed unconditionally. This is not convenient for a driver, who cannot perform operations other than driving during vehicle running.

To deal with this problem, even when a command is determined to be the prohibition command of the DA 50, the in-vehicle system 3 does not immediately cause the portable terminal 70 to execute the command. The in-vehicle system 3 sets as the prohibition command of the portable terminal 70, a command whose execution is expected to cause disadvantages to the owner of the portable terminal 70. Such commands are, for example, a command which is expected to cause the violation of owner's privacy when executed on the portable terminal 70, a command whose execution is expected to result in unreasonably expensive charges for the use of network contents. Thus, when an occupant does not want the execution of a certain command, such command can be prevented from being executed.

By performing determination based on the above scheme, the DA 50 can acquire the following four patterns of determination results: a determination result that execution of a command in the DA 50 is permitted; a determination result that execution of a command in the portable terminal 70 is permitted; a determination result that execution of a command in neither the portable terminal 70 nor the portable terminal 70 is permitted; and a determination result that execution of a command in both the portable terminal 70 and the portable terminal 70 is permitted.

In this case, when it is determined that execution of a command in the own device is permitted, the DA 50 notifies a determination result that execution of the command in the portable terminal 70 is not permitted (6), and performs a process corresponding to the command (7)-1. When it is determined that execution of a command in the portable terminal 70 is permitted, the DA 50 notifies a determination result that execution of the command in the portable terminal 70 is permitted (6), and causes the portable terminal 70 to perform a process corresponding to the command (7)-2.

Further, when it is determined that execution of a command in both the DA 50 and the portable terminal 70 is permitted, the DA 50 notifies a determination result that execution of the command in the portable terminal 70 is permitted (6), performs a process corresponding to the command in the own device (7)-1, and causes the portable terminal 70 to perform a process corresponding to the command (7)-2.

On the other hand, when it is determined that execution of a command in neither the DA 50 nor the portable terminal 70 is permitted, the DA 50 notifies a determination result that execution of the command in the portable terminal 70 is not permitted (6), and does not cause any device to execute the command.

As explained above, in the second embodiment, irrespective of a characteristic of a command given by an occupant, the command is caused to be executed by an appropriate device. At the same time, execution of a command having a risk of generating a disadvantage to the occupant can be prohibited. A command can be executed in a device intended by the occupant, and execution of a command not desired by the occupant can be prevented. As a result, a command given by the occupant can be executed more appropriately.

A configuration of devices constituting the in-vehicle system 3 according to the second embodiment is explained next. The in-vehicle system 3 is explained in comparison with the in-vehicle system 1 according to the first embodiment. Constituent elements having like functions to those of the first embodiment are denoted by like reference numerals, and explanations thereof will not be repeated.

Figure 6:
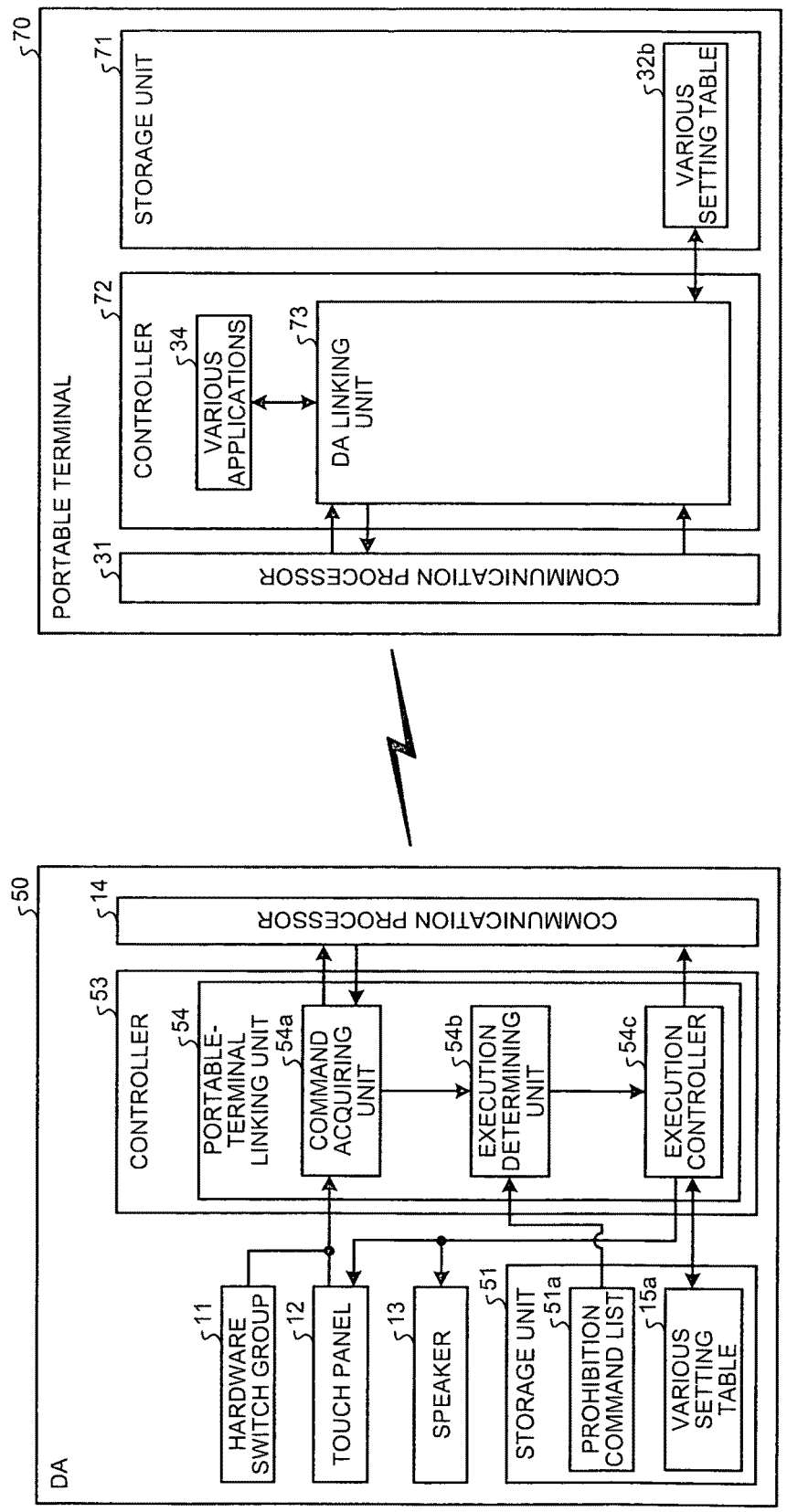
FIG. 6 is a functional block diagram of a configuration of devices constituting the in-vehicle system according to the second embodiment.

FIG. 6 is a functional block diagram of a configuration of devices constituting the in-vehicle system 3 according to the second embodiment. As illustrated in FIG. 6, the portable terminal 70 is different from the portable terminal 30 depicted in FIG. 2 in that a storage unit 71 does not include the prohibition command list 32a and that a DA linking unit 73 included in a controller 72 does not include the execution determining unit 35a and the execution controller 35b.

On the other hand, the DA 50 is different from the DA 10 depicted in FIG. 2 in that a storage unit 51 includes a prohibition command list 51a, and that a portable-terminal linking unit 54 of a controller 53 includes a command acquiring unit 54a, an execution determining unit 54b, and an execution controller 54c.

The prohibition command list 51a is a list of prohibition commands. Specifically, the prohibition command list 51a stores each prohibition command whose execution in the DA 50 is prohibited, by relating each prohibition command to a private flag that indicates whether the prohibition command is a private command for the execution in the portable terminal 70.

In an example depicted in FIG. 7, private flags of a command α, a command β, and a command δ are in an off state. Therefore, execution of these commands in the DA 50 is prohibited, and execution of these commands in the portable terminal 70 is permitted. On the other hand, because a private flag of a command γ is in an on state, execution of the command γ in both the DA 50 and the portable terminal 70 is prohibited. While execution of commands concerning private items is prohibited in the portable terminal 70 in this example, similar flags can be provided in relation to each disadvantageous action for the occupant, and a flag that collectively indicates disadvantageous actions can be provided as a disadvantageous-action flag.

The command acquiring unit 54a is a processor that acquires a command corresponding to an operation by an occupant. Specifically, by transferring to the portable terminal 70 operation data (a pressed coordinate position on the screen, for example) including operation contents received on the touch panel 12, the command acquiring unit 54a causes the portable terminal 70 to interpret the command and respond, thereby acquiring the command.

The execution determining unit 54b is a processor that determines whether to permit execution of a command acquired by the command acquiring unit 54a. Specifically, the execution determining unit 54b determines whether a command acquired by the command acquiring unit 54a is a prohibition command in the prohibition command list 51a stored in the storage unit 51. When the command is a prohibition command, the execution determining unit 54b further determines whether a private flag of the prohibition command is in an off state.

The execution controller 54c is a processor that controls whether to cause at least one of the DA 50 and the portable terminal 70 to execute a command based on a determination result of the execution determining unit 54b.

For example, when the execution determining unit 54b determines that a command is not a prohibition command, the execution controller 54c notifies a determination result that execution of the command in the portable terminal 70 is not permitted, and performs a process corresponding to the command.

Further, when the execution determining unit 54b determines that a command is a prohibition command and that a private flag of the prohibition command is in an off state, the execution controller 54c notifies a determination result that execution of the command in the portable terminal 70 is permitted, and causes the portable terminal 70 to perform a process corresponding to the command.

On the other hand, when the execution determining unit 54b determines that the command is a prohibition command and that a private flag of the prohibition command is in an on state, the execution controller 54c notifies a determination result that execution of the command in the portable terminal 70 is not permitted, and does not cause any device to execute the command.

Focusing on the problem that when a command common to both the DA 50 and the portable terminal 70 is present as in the first embodiment, the owner of the portable terminal 70 may feel uncomfortable when trying to use the portable terminal 70 by itself after getting off the vehicle and find the setting of the portable terminal 70 has changed, the DA 50 depicted in FIG. 6 is configured to execute the command exclusively. When the execution determining unit 54b determines that the command is not a prohibition command of the DA 50, it is not further determined whether the command is a prohibition command of the portable terminal 70. Thus, the DA 50 executes the command by itself, except in a case when the command is executed in both the DA 50 and the portable terminal 70 in a parallel manner. Execution control of causing both the DA 50 and the portable terminal 70 to execute the command is explained later.

A flow of a command-execution control process according to the second embodiment is explained next. The command-execution control process is performed when the DA 50 is present within a communication range of the portable terminal 70 and a connection is established between the DA 50 and the portable terminal 70.

Figure 8:
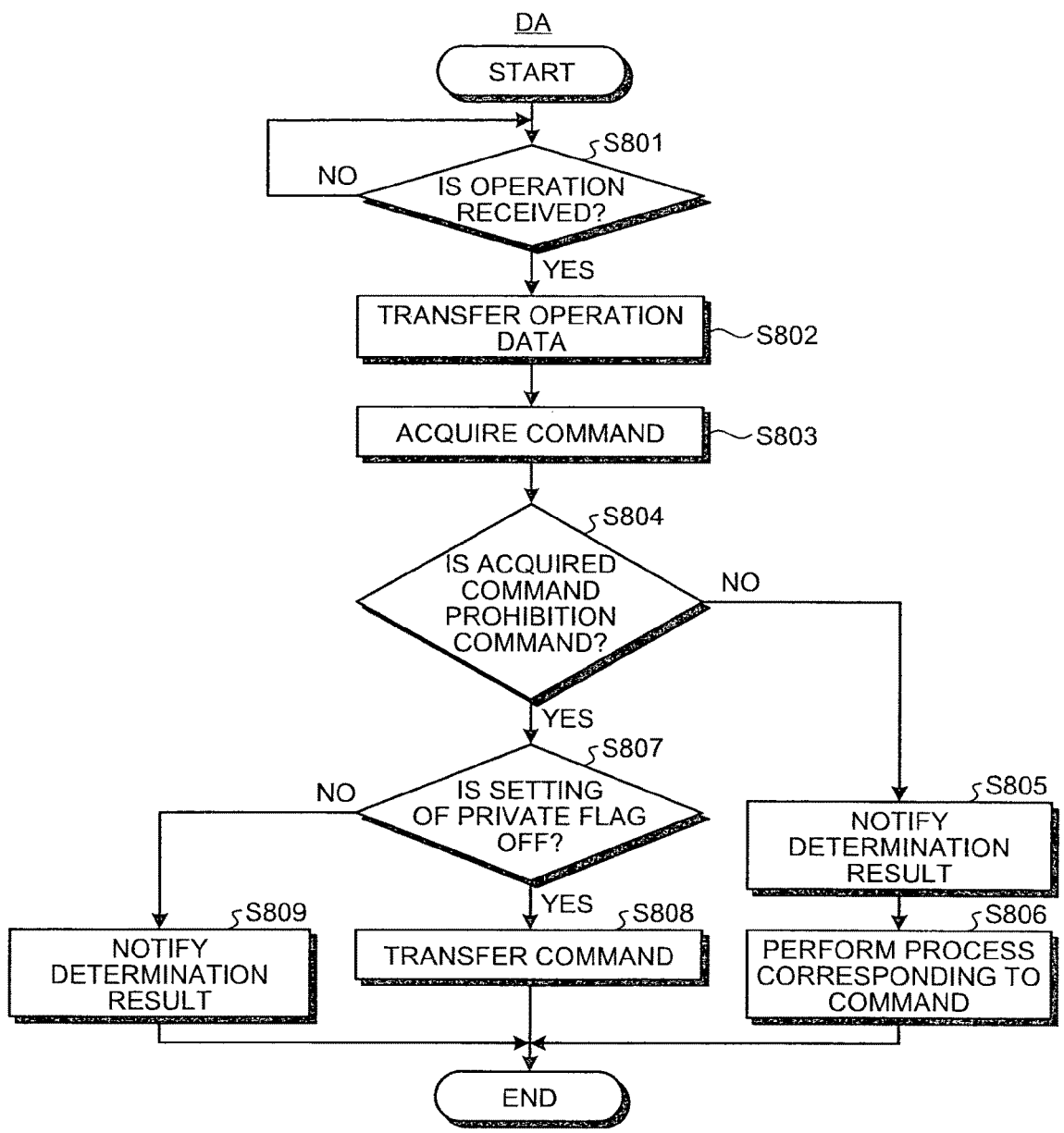
FIG. 8 is a flowchart of a command-execution control-process procedure according to the second embodiment.

FIG. 8 is a flowchart of a command-execution control-process procedure according to the second embodiment. As depicted in FIG. 8, when the DA 50 is in a state of waiting for reception of an operation, and receives an operation on the touch panel 12 (YES at Step S801), the command acquiring unit 54a transfers to the portable terminal 70 operation data such as a coordinate position of an icon pressed on the touch panel (Step S802), thereby acquiring a command by a response from the portable terminal 70 (Step S803).

The execution determining unit 54b determines whether the command acquired by the command acquiring unit 54a is a prohibition command in the prohibition command list 51a stored in the storage unit 51 (Step S804).

When the execution determining unit 54b determines that the command is not a prohibition command (NO at Step S804), the execution controller 54c notifies a determination result indicating that execution of the command in the portable terminal 70 is not permitted (Step S805), executes a process corresponding to the command (Step S806), and ends the process.

On the other hand, when the command is a prohibition command (YES at Step S804), the execution determining unit 54b further determines whether a private flag of the prohibition command is in an off state (Step S807).

When the execution determining unit 54b determines that the private flag of the prohibition command is in the off state (YES at Step S807), the execution controller 54c transfers to the portable terminal 70 the command whose execution in the portable terminal 70 is determined to be permitted (Step S808), causes the portable terminal 70 to perform a process corresponding to the command, and ends the process.

When the execution determining unit 54b determines that the private flag of the prohibition command is in an on state (NO at Step S807), the execution controller 54c notifies a determination result that execution of the command in the portable terminal 70 is not permitted (Step S809), and ends the process without causing any device to execute the command.

As described above, in the second embodiment, the DA 50 is configured to acquire a command corresponding to the operation performed with respect to the DA 50. The DA 50 determines on the execution of the command based on whether the acquired command is a prohibition command of the DA 50, and also based on whether the command is a prohibition command of the portable terminal 70 as the other device. When it is determined that execution of the command in the DA 50 is permitted, the own device (i.e., DA 50) is caused to execute the command. When it is determined that execution of the command in the portable terminal 70 as the other device is permitted, the portable terminal 70 is caused to execute the command. When it is determined that execution of the command in neither the DA 50 nor the portable terminal 70 is permitted, execution of the command in any device is prohibited.

Therefore, when a function corresponding to a command given by an occupant is present in both the DA 50 and the portable terminal 70, the command is executed in a device intended by the occupant. At the same time, it is also possible to prevent the execution of a command having a risk of violating the privacy of the occupant who is the owner of the portable terminal 70 and causing disadvantage to the owner, such as exceptionally high charge for the use of network contents.

Accordingly, in the second embodiment, it is also possible to prevent execution of a command not desired by the occupant. Consequently, the command given by the occupant can be executed appropriately.

In the first and second embodiments, whether to execute a command or not is determined by using the prohibition command list. The present invention can be similarly applied to a case that a command is executed by using a permission command list including permission commands.

In the first and second embodiments, it is assumed that a code of a command is common to the DA and the portable terminal. Even when code systems are different between the DA and the portable terminal, the present invention can be similarly applied if one of the DA and the portable terminal has a code correspondence table that defines a correspondence of each command of the DA and the portable terminal.

In the first and second embodiments, whether to execute a command or not is determined by using one prohibition command list 32a or 51a. Alternatively, the list used for the determination can be suitably changed, by holding plural prohibition command lists.

For example, a different prohibition command list may be registered in a storage unit of the DA or the portable terminal depending on the state of the vehicle, i.e., whether the own vehicle is parked or is running. Speed information may be acquired from an electronic control unit (ECU) incorporated in the vehicle. When the vehicle is parked, a prohibition command list that permits browsing of a general command of private information is used to determine execution of a command. On the other hand, when the vehicle is running, a prohibition command list that prohibits browsing of a general command of private information is used to determine execution of a command.

With this arrangement, a flexible control can be performed. When a driver is able to operate the DA, browsing of private information is permitted, and when the driver is not able to operate the DA, browsing of private information is prohibited.

While an example of using one of two prohibition command lists depending on whether the vehicle is parked or is running has been explained above, the number of the lists can be set arbitrarily. Further, a list can be provided for each number of occupants, for each sitting position of occupants, for each location where the vehicle is positioned, or for each time zone.

In the first and second embodiments, the command execution control is performed to cause one of the DA and the portable terminal to execute the command, or to cause neither the DA nor the portable terminal to execute the command. As described above, when the command is not a prohibition command of the DA and also not the prohibition command of the portable terminal, both devices can be caused to execute the command.

Assume that the DA can amplify a sound volume up to M decibel [dB], and that the portable terminal can amplify a sound volume up to N dB. When an occupant desires a sound volume exceeding N dB or M dB, sound data of a radio or music cannot be output in a sound volume desired by the occupant when a sound volume of only one of the DA and the portable terminal is adjusted. When a sound volume is amplified by both devices, sound data can be output as desired by the occupant.

Additionally, when a command is for setting either volume or a period concerning sound or display, one of the portable terminal and the DA can be caused to execute the command until the volume or the period set reaches a predetermined threshold value. When the volume or the period is set equal to or higher than the threshold value, both the portable terminal and the DA can be caused to execute the command. In this way, staged execution control can be also achieved.

As described above in relation to the first and second embodiments, some prefer to keep various settings of the portable terminal unchanged, because the portable terminal is used outside the vehicle as well. Therefore, if the DA alone can amplify the sound volume up to a level (i.e., volume) set by the occupant, the DA is caused to execute the command for increasing the sound volume. On the other hand, if the DA alone cannot amplify the sound volume up to a level set by the occupant, both the DA and the portable terminal are caused to execute the command. Thus, the need for prevention of change in settings of the portable terminal is prioritized as far as possible, while the performance exceeding the quantitative limitation of one device can be achieved. In addition to the performance regarding the sound, similar performance can be achieved with regard to display such as brightness of a display screen.

In the first and second embodiments, command execution control is performed after it is determined whether the command can be executed or not. However, the present invention is not limited thereto. For example, at least one of the DA and the portable terminal may include a command-executing-device management table 90 (see FIG. 9) in which a command and a device executing the command are determined in advance. Then, a device, which is defined as an executing device of a command given by the occupant in the command-executing-device management table 90, may be caused to execute the command.

Figures 9, 10:
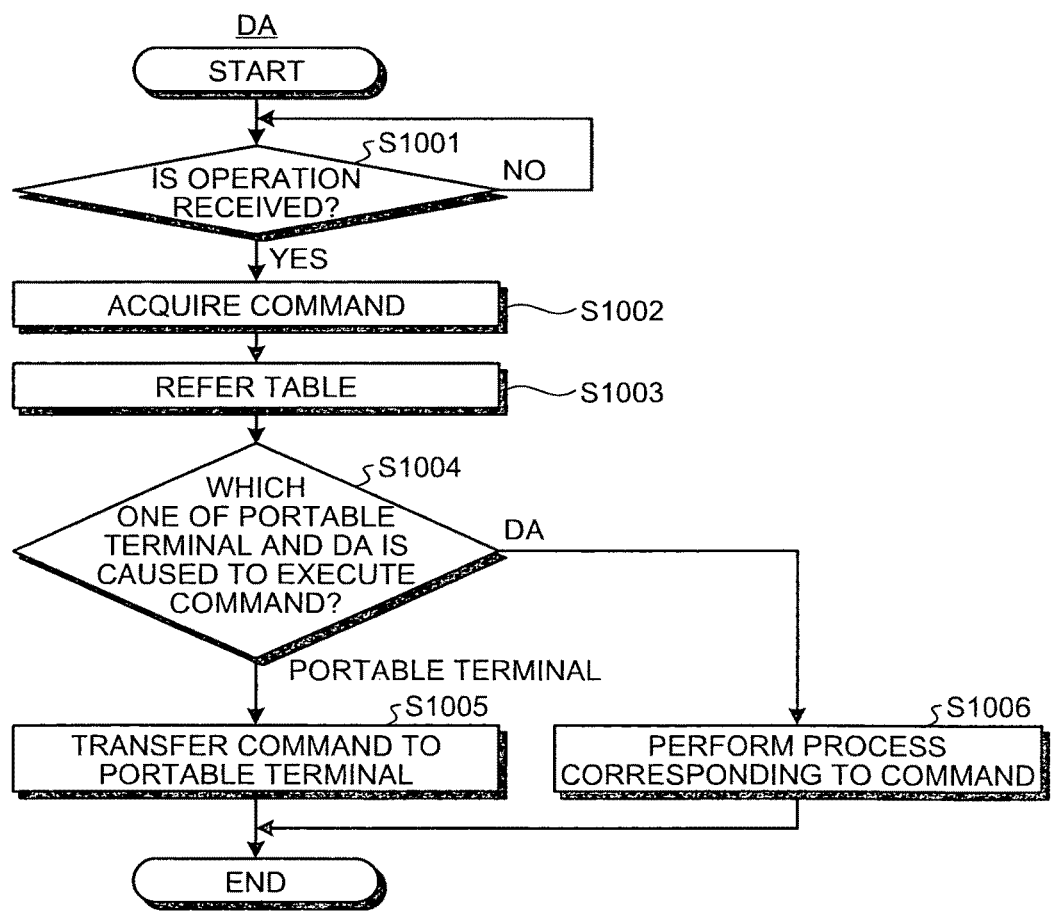
FIG. 9 is a schematic diagram for explaining a modification of the present invention.
FIG. 10 is a flowchart of a command-execution control-process procedure according to the modification.

For instance, in the example depicted in FIG. 9, when a command "a" is received, the portable terminal executes the command "a". When a command "b" is received, both the DA and the portable terminal execute the command "b". When a command "c" or "d" is received, the DA executes the command. When a command "e" is received, neither the DA nor the portable terminal executes the command "e".

FIG. 10 is a flowchart of a command-execution control-process procedure according to a modification of the present invention. In this example, one of the DA and the portable terminal serves as a device executing a command. Alternatively, however, when a device related to a command is set as "both" or "none" as depicted in FIG. 9, both devices can be caused to execute a command or none of the devices can be caused to execute a command.

As illustrated in FIG. 10, when the DA is in a state of waiting for an operation from an occupant, and receives an operation on the touch panel 12 (YES at Step S1001), the DA transfers operation data such as a coordinate position of an icon pressed on the touch panel 12 to the portable terminal, and acquires a command by a response from the portable terminal (Step S1002).

The DA refers to the command-executing-device management table 90 for a command-executing device corresponding to the command given by an occupant (Step S1003), and determines which one of the DA and the portable terminal is caused to execute the command (Step S1004).

When the DA determines to cause the portable terminal to execute the command, the DA transfers, to the portable terminal, the command whose execution in the portable terminal 70 is determined to be permitted (Step S1005), causes the portable terminal to perform a process corresponding to the command, and ends the process.

On the other hand, when the DA determines to cause the DA to execute the command, the DA notifies a determination result of not permitting the portable terminal to execute the command, performs a process corresponding to the command (Step S1006), and ends the process.

When the above process is performed, in a similar manner to that in the first and second embodiments, a device intended by the occupant can be caused to execute the command, and execution of a command not desired by the occupant can be prevented. As a result, an operation command by the occupant can be executed appropriately. Further, no matter which of the DA and the portable terminal holds the command-executing-device management table 90, a table configuration does not need to be changed. In the above description of the example, the DA performs execution control using the table, however, the portable terminal can also perform the execution control.

In the first and second embodiments, it is assumed for simplicity of description that, other than the unit for outputting sound and images, the DA is configured to have minimum function. However, the performance of the DA is not necessarily limited. For example, it is possible to provide the DA as a multi-functional in-vehicle device by forming a cartridge, which has a function equivalent to the portable terminal and is attachable/detachable to/from the DA, and mounting the cartridge on the DA as an optional unit.

In the first and second embodiments, an operation is received via a touch panel. The present invention, however, is not limited thereto. It suffices that a command-recognizable input is made to the DA or the portable terminal. For example, in addition to a hardware switch, a voice recognition engine may be installed in the DA or in the portable terminal. Then, the occupant can provide an input to the DA or the portable terminal through a sound input unit such as a microphone of the DA or the portable terminal by speaking instead of pressing the touch panel.

In the first and second embodiments, the DA and the portable terminal are in a one-to-one relationship. These devices, however, do not need to be in a one-to-one relationship. The present invention can be also applied to a case that the DA and the portable terminal device are in a relationship of one to N.

In the first and second embodiments, the present invention is applied to an in-vehicle system. An application range of the present invention is not limited thereto. The present invention can be applied to a system including a portable terminal and a device having a sound output unit or a display output unit.

As explained above, the in-vehicle system, the in-vehicle device, and the method for controlling execution of commands of the in-vehicle device according to the present invention are suitable for appropriately executing commands given by an occupant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle system including a portable terminal and an in-vehicle device, wherein
   one device selected from a group consisting of the portable terminal and the in-vehicle device includes:
   an acquiring unit configured to acquire a command corresponding to an operation performed with respect to the portable terminal or the in-vehicle device;
   a determining unit configured to determine whether execution of a command acquired by the acquiring unit is permitted, based on whether the command is related to a predetermined disadvantageous action for an occupant of a vehicle; and
   an execution controller configured to transfer the command to another device in the group when the determining unit determines that the execution of the command is not permitted, to cause the another device to execute the command, wherein:
   the determining unit is configured to determine whether execution of the command acquired by the acquiring unit is permitted, depending on whether the command corresponds to one of a permission condition and a prohibition condition for execution of the command in the one device, and whether the command corresponds to one of a permission condition and a prohibition condition for execution of the command in the another device; and
   the execution controller is configured to cause the one device to execute the command when the determining unit determines that the execution of the command in the one device is permitted, transfers the command to the another device when the determining unit determines that the execution of the command in the another device is permitted, and prohibits the execution of the command in either the one device or the another device when the determining unit determines that the execution of the command in the one device and the another device is not permitted.

2. A method for controlling execution of a command applied to an in-vehicle system including a portable terminal and an in-vehicle device, the method comprising:
   acquiring, by one device selected from a group consisting of the portable terminal and the in-vehicle device, a command corresponding to an operation performed with respect to the portable terminal or the in-vehicle device;
   determining, by the one device, whether execution of a command acquired in the acquiring step is permitted, based on whether the command is related to a predetermined disadvantageous action for an occupant of a vehicle, by determining whether the command corresponds to one of a permission condition and a prohibition condition for execution of the command in the one device, and whether the command corresponds to one of a permission condition and a prohibition condition for execution of the command in another device in the group;
   transferring, by the one device, the command to the another device when the execution of the command in the another device is permitted, to cause the another device to execute the command;
   causing, by the one device, the one device to execute the command when the execution of the command in the one device is permitted; and prohibiting, by the one device, the execution of the command in either the one device or the another device when the execution of the command in the one device and the another device is not permitted.

* * * * *